INVENTOR
PAUL PEVNEY
BY
ATTORNEY

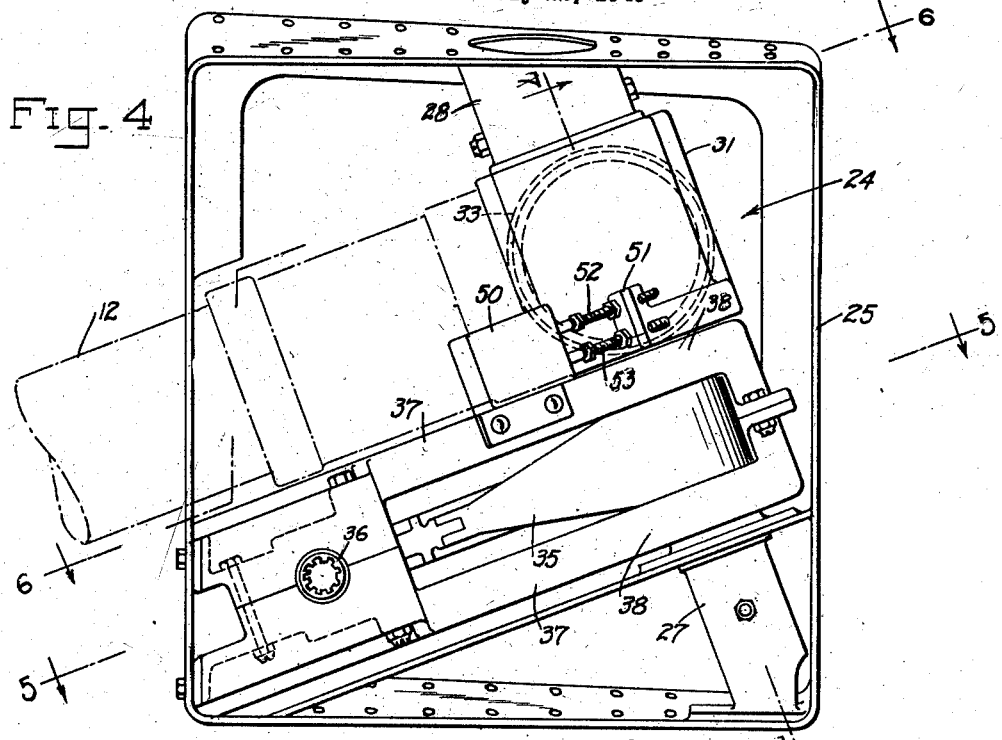
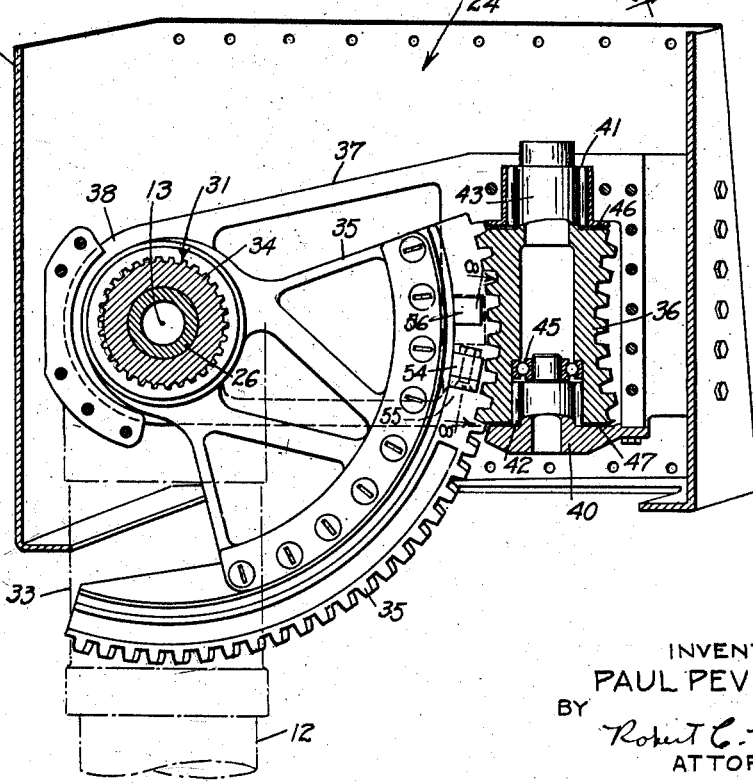

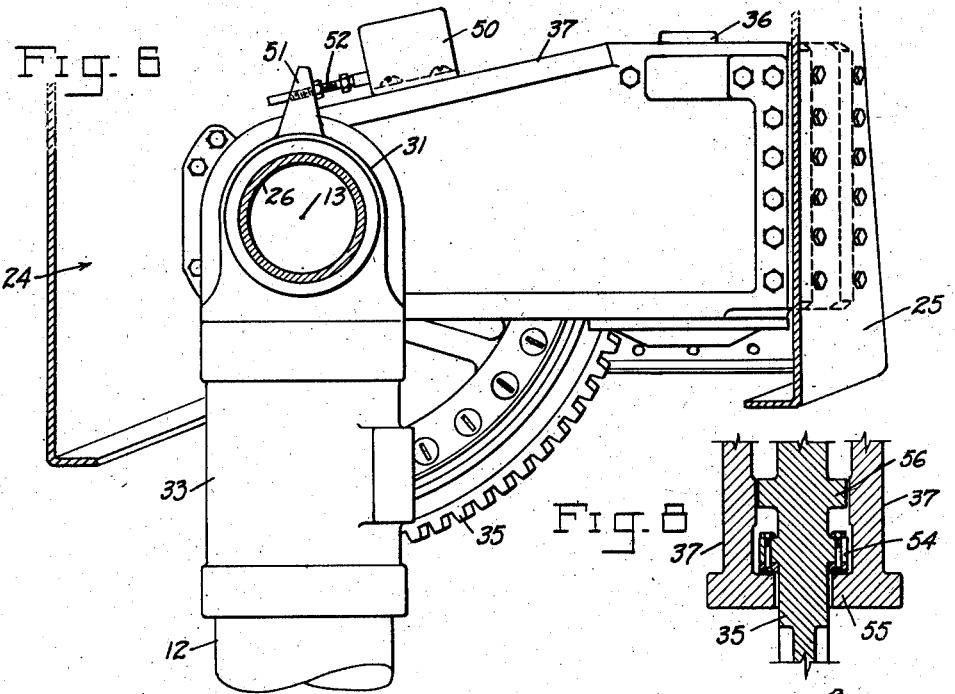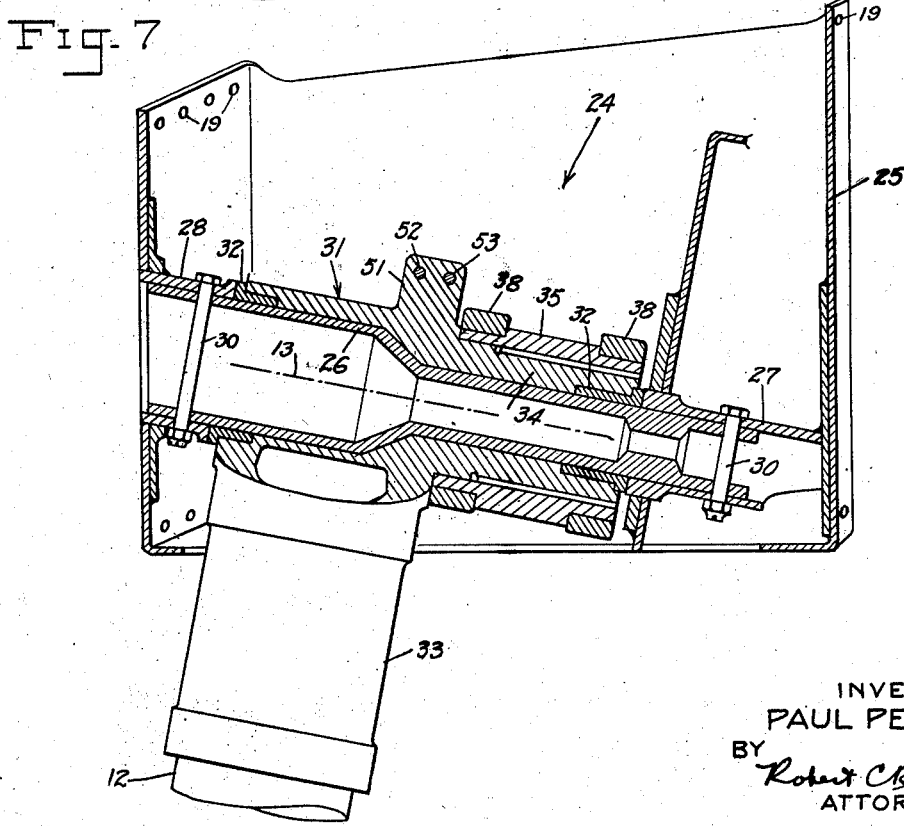

Sept. 15, 1942.         P. PEVNEY         2,296,117
                     AIRCRAFT STRUCTURE
                     Filed July 22, 1940        4 Sheets-Sheet 4

INVENTOR
PAUL PEVNEY
BY
Robert C. Rasche
ATTORNEY

Patented Sept. 15, 1942

2,296,117

UNITED STATES PATENT OFFICE 2,296,117

AIRCRAFT STRUCTURE

Paul Pevney, Massapequa, N. Y., assignor to Republic Aviation Corporation, a corporation of Delaware Application July 22, 1940, Serial No. 346,754

11 Claims. (Cl. 244—102)

This invention relates to airplane landing gear and has reference more particularly to flush type retractable landing gear housed in the wing structure and projectable therefrom for landing.

The invention has for one of its objects the provision of a simple and reliably operative retractable landing gear adapted for cantilever support on the usual spar and rib members of a pre-fabricated and pre-assembled multi-cellular wing structure, thus avoiding any appreciable changes to these wing members.

Another object is the provision of a retracting mechanism of the worm and gear type having a worm of the double enveloping type combined with bearing means for this worm and this gear and assuring proper distribution of the load in landing and taxiing the airplane.

A further object is to provide a retracting mechanism of the worm and gear type of such compact organization as to be adapted for housing and support within a pre-fabricated and pre-assembled multi-cellular wing in one of the usual cubical cells defined by the conventional spar and rib members of the wing, and to provide a cubic gear box for the worm-and-gear mechanism, forming a unitary box-like structure therewith, and fastening means to enable the attachment or removal of this gear box as a unit for replacement or repairs.

Other objects and advantages will hereinafter appear.

The presently-preferred embodiments of the invention are disclosed in the accompanying drawings and described hereinafter, merely by way of example, the invention being limited in its embodiments only by the scope of the subjoined claims.

In the drawings

Figure 4 is a top plan view of the retracting mechanism apart from the airplane, looking directly down on said mechanism.

Figure 5 is a transverse sectional view taken on line 5—5 of Figure 4, portions of the mechanism being shown in elevation.

Figure 6 is a sectional view on line 6—6 of Figure 4 showing the retracting mechanism in side elevation.

Figure 7 is a sectional view taken on line 7—7 of Figure 4, being a view in central section along the axis of the shock strut pivot.

Figure 8 is a fragmentary sectional view taken on line 8—8 of Figure 5, and

Figure 1:
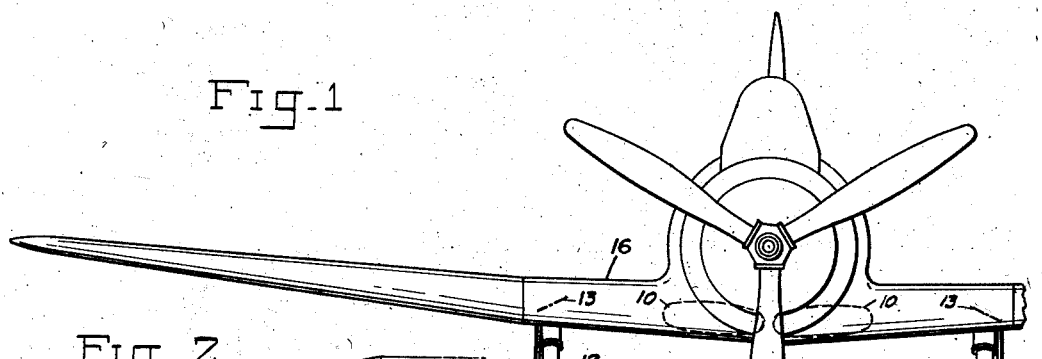
Figure 1 is a front elevational view of an airplane showing the landing gear of the invention in projected position.
Figure 2:
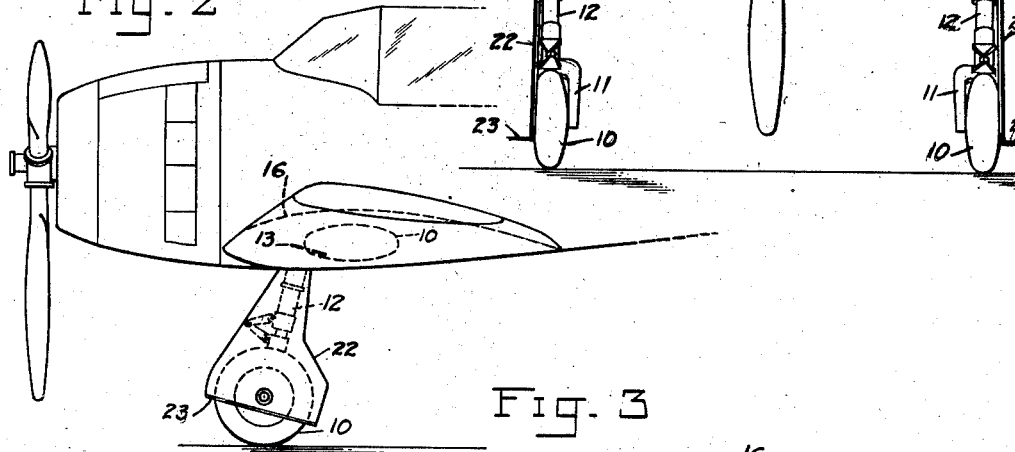
Figure 2 is a side elevational view of the airplane shown in Figure 1.
Figure 3:
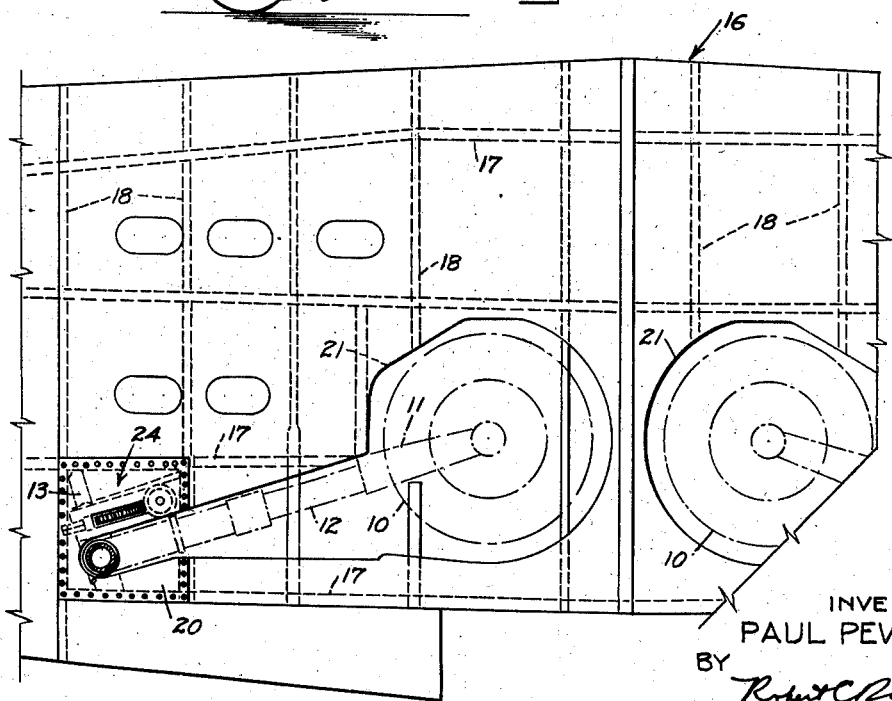
Figure 3 is a bottom plan view of the central wing panel within which the landing gear is held.

In the embodiment of the invention illustrated in Figures 1 to 8 inclusive, of the drawings, each leg of the landing gear includes the usual wheel 10 carried on a yoke 11 supported on a conventional shock absorber strut 12, the latter being pivotally mounted at its upper end on an axis 13 for retracting movement of the landing gear into the wing structure as shown in phantom in Figure 3. The wheel 10 is preferably required to be somewhat forward of the center of gravity of the airplane to properly support the airplane in landing, and the shock strut 12 has its longitudinal axis substantially intersecting a transverse line of the airplane passing through a point also forward of center of gravity. It is also preferred to position the wheel and associated landing gear, when retracted, somewhat rearward of the center of gravity; this, in order to have the wheel 10 and yoke 11 disposed in the wing portion of the maximum thickness, as will be apparent in the dotted showing in Figures 1 and 2. The first requirement necessitates inclining the shock strut 12 fore-and-aft, as shown in Figure 2, which therefore locates the upper end of the shock strut 12 in the forward region of the wing panel, as shown more clearly in Figure 3. To fulfill the second requirement and thus bring the wheel and associated landing gear to the desired retracted position, it is necessary that the axis 13 about which the shock strut 12 pivots be disposed at a skewed angle with reference to the fore-and-aft axis of the plane, which axis is also skewed from the horizontal to accommodate the forward tilting of the shock strut 12 shown in Figure 7.

This skewing of the pivotal axis 13 presents a problem in supporting the shock strut 12 in the conventional spar and rib members of the wing, in that these members are disposed substantially laterally and longitudinally of the airplane.

In the "Republic" airplane illustrated in the drawings the wing structure comprises a central wing panel 16 symmetrically arranged on the fuselage and forming the support thereon for each other wing panel. This center wing panel therefore presents a substantially rigid air foil structure comprising lateral members or spars 17 and longitudinal members or ribs 18 upon which the skin or outer air foil covering is secured.

To maintain the required structural strength of the wing panel 16, at the same time avoiding any major changes in the arrangement and allocation of the structural members 17, 18, it is important that the spars and ribs be arranged laterally and longitudinally of the airplane substantially as shown. From these pre-requisites it will follow that the retracting mechanism for the full cantilever landing gear be confined within one of the cubical cells defined by said structural members. Also, the fact that a large volume of the central wing panel is required for other purposes, such as the storage of fuel, makes it requisite that the retracting mechanism be adaptable for a highly compacted arrangement. For these reasons the entire retracting mechanism, upon which the wheel-supporting shock strut is cantilever supported, is disposed entirely within the wing cell indicated at 20 in Figure 3, which is bounded by adjacent pairs of spars 17 and ribs 18.

In its retracted position, each leg of the landing gear is contained in a recess 21 formed of a number of cells within the wing adjacent the area 20. The wing covering is omitted over an area of the recess 21 and defines an opening having a general outline of the shock strut 12 and wheel 10. In flight, this opening is covered and closed by a fairing 22 of like configuration, which is carried on the landing gear and moves therewith to retracted or extended positions. A flap 23 of the fairing swings outwardly when the landing gear is extended, to provide ground clearance at the wheel, see Figure 2.

The landing gear retracting mechanism, indicated generally at numeral 24, is shown in detail in Figures 4 to 8. It is entirely housed within a cubical gear-box 25, which in turn can be readily and detachably secured to the reenforcing members 17, 18 of the wing structure, as by bolts passing through apertures 19 in the gear-box; it being noted that the side walls of gear-box 25 are arranged to fit into the cell 20 formed by certain of the spars and ribs of the wing. In this manner, the skewed pivot 13 of the shock strut and the associated retracting mechanism are readily adapted for attachment to the conventional wing structure with only a minimum of changes such as the provision of attachment means securing the gear-box 25 to the wing spars and ribs.

In the embodiment, shown in Figures 4 to 8, the strut skewed pivot 13 is formed by a tubular spindle 26 extending through the gear-box 25 and secured at each end thereof in sleeves 27 and 28, each affixed by suitable means such as welding to the box 25, as shown in Figure 7. To facilitate replacement or repairs the spindle 26 is detachably secured to the sleeves 27, 28 by suitable means such as bolts 30 passing through these parts, the spindle being axially withdrawable through an opening in the box 25 after removing the bolts.

A hub 31 is rotatably mounted on the spindle 26 by bearings 32 at each hub end and the hub has an integral socket 33 securing the shock strut 12 thereto. Hub 31 extends axially at one side in a sleeve 34 on which a gear segment 35 of a worm and gear mechanism is splined. As shown more clearly in Figure 5, the gear 35 is in mesh with the worm 36, the axis of which is at a right angle to strut axis 13.

By the use of the "Hindley" type of worm gear 35, 36 shown, in which the worm 36 is globoidal in form and, therefore, has each convolution thereof in mesh with a gear tooth, a materially compacted mechanism is had in that the gear segment 35 may have its teeth of relatively small size and the radius of the gear segment is thus materially reduced over the other types of worm gear.

The lateral stresses applied to the retracting mechanism 24 in landing the airplane have a tendency to separate the spindle axis 13 and the axis of the worm 36, which is counteracted by a bearing bracket 37 extending between these axes os as to provide rotational support for the worm 36 and lateral support for the sector 35. The bracket 37 comprises two separable half members, each of which has a collar 38 embracing the hub of gear 35, see Figure 7, and providing a housing for the worm 36, closed at one end by a bearing plate 40.

The reaction of the mechanism parts is such that the worm 36 is subjected to both radial and axial or thrust loads. The radial loads on the worm are sustained on roller-bearings 41, 42 adjacent each end of the worm. Bearing 41 journals a trunnion 43 on the worm and has its outer race pressed into the bore of thrust bearing 46, which is held between the two members of the bearing bracket 37. Bearing 42 has its outer race housed in the bore of the worm, its inner race being provided by a projecting member of the bearing plate 40.

The worm 36 acts in two capacities; one, in retracting and extending the landing gear, during which the worm is subjected to relatively light axial loads and; two, in acting as a lock when the landing gear is fully extended and subjected to lateral thrusts while the airplane is taxiing. The latter loads are of great magnitude because of the cantilever mounting of the landing gear and of the compact size of its retracting mechanism. The thrust loads on the worm 36 imparted while retracting and extending the landing gear are sustained by a radial-thrust ballbearing 45 carried on a stub of bearing plate 40. The heavy thrust loads on worm 36 are sustained in either axial direction by thrust bearings 46 and 47 abutting the respective ends of the worm.

The bearings 45, 46 and 47 are so arranged and assembled that the ball bearing 45 supports thrust loads only of a light magnitude and the thrust bearings 46 or 47 are made effective when greater loads are applied, such as may occur by lateral road shocks on the landing gear. This is accomplished by a method of pre-stressing the bearing 45, now to be described. It is to be noted that the bearing 45, although of the radial-thrust type, is adequate to sustain only the lighter thrust loads. Such thrust loads are confined only to the bearing 45 by providing a clearance between the worm 36 and each of the thrust bearings 46, 47. In assembling the mechanism, bearing 45 is pre-stressed by adjusting the bearing plate 40 in an upward direction, as viewed in Figure 5, in such manner as to axially displace the inner race of bearing 45 relatively to its outer race and thus subject the entire bearing to the maximum axial stress to which same is subjected during the retracting operation of the mechanism; it being noted that, when making this adjustment, the shock strut 12 is in retracted or substantially horizontal position. In effect, this system of assembly and adjustment takes up any axial back-lash in the bearing 45, the result that the worm 36 is suspended between and clear of the two thrust bearings 46, 47 and, therefore, the latter bearings do not impart any frictional resistance to rotating of the worm during the retracting operation. However, when the worm acts as a lock with the landing gear fully extended, the bearing 45 readily yields to any thrust load in excess of the normal, which load is therefore sustained by either of the thrust bearings 46, 47.

The retracting mechanism 24 is preferably power-operated by an electric motor and suitable power-transmission arranged to drive the worm 36. The motor, not shown, may provide a drive in either direction so as to retract or protract the landing gear, at the will of the pilot, a suitable control switch being provided in the cockpit. The electric circuit for energizing the motor may include a limit switch 50 shown in Figure 6 by which, when the landing gear is fully extended, the motor circuit is broken and the motor drive is thus discontinued. The switch 50 is operated by an arm 51 carried on the strut-supporting hub 31 and having a push rod 52 adjustably mounted thereon and arranged to open the switch 50 when the landing gear is fully extended. A second switch, also actuated by the arm 51 and a second push rod 53, similar to the rod 52, may be provided to control a signal in the cockpit to indicate to the pilot that the landing gear is being operated to extend or retract same.

In cooperation with the limiting switch 50, an emergency positive stop is provided to stop the gear 35 at the full protracted position of the landing gear. As shown more clearly in Figures 5 and 8, a stop lug 54 is carried on the gear 35 adjacent its periphery and arranged to engage a member 55 on the bearing bracket 37. The clearance shown between the parts 54 and 55, to facilitate illustration, is provided so that these parts are normally out of contact, being brought into engagement only when abnormal stresses are applied to the shock strut, thus to obviate any injury to the mechanism, or to avoid serious consequences in the event that the motor-drive control mechanism is ineffective.

The gear 35 also includes lugs 56 by which lateral deflection of the gear may be limited to a normal extent. When normal lateral deflection is exceeded, the lugs 56 come into engagement with either member of the bearing bracket 37 to prevent distortion of the gear.

Figure 9:
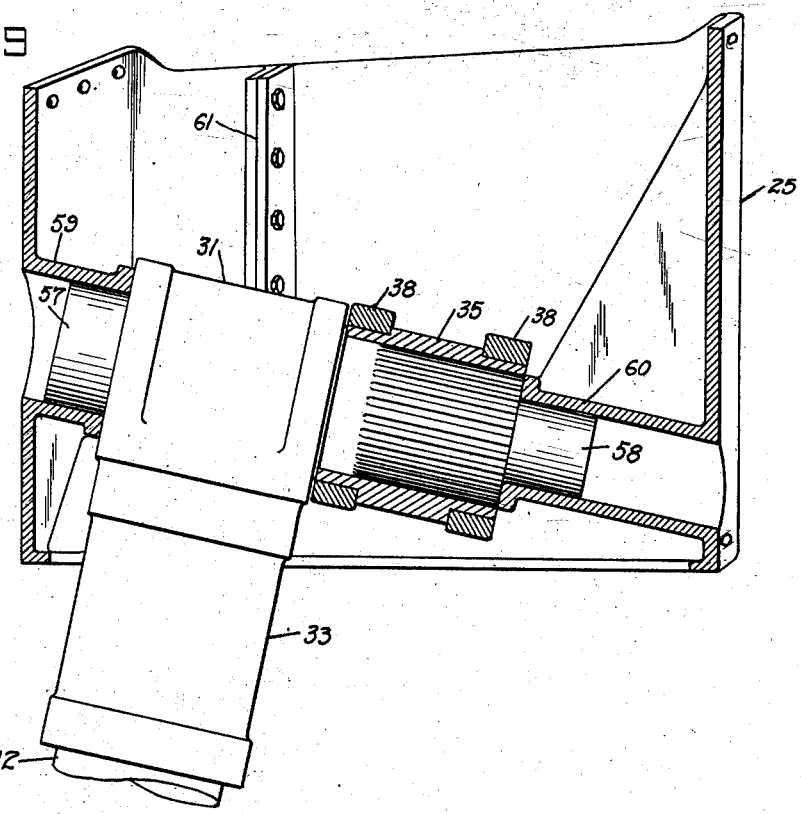
Figure 9 is a sectional view similar to Figure 7, but showing a modified form of the invention, portions of the mechanism being shown in elevation.

Reference is now had to Figure 9 of the drawings illustrating a modified form of the mounting means for the wheel strut and its retracting mechanism. In this form, trunnions 57 and 58 are formed integral with the strut hub 31 to provide the skewed axis 13 of the strut. In this modified construction, the box 25 takes the form of a casting upon which journal bearings 59 and 60 are integrally cast, in which bearings the trunnions 57, 58 are journalled. To facilitate assembly and removal, the box 25 may comprise two separable members suitably joined along a meeting area, such as at 61.

Having now made certain the nature and purposes of my invention, in such manner as to enable anyone skilled in the art to which it appertains, to make and use same, as required by the statutes, that which I claim as my property, and desire to secure by Letters Patent of the United States, is:

1. In a full flush retractable landing gear for an airplane having a multi-cellular wing structure including longitudinal and lateral reenforcing members at spaced intervals with cubiform cells there-between, a wheel-supporting strut, means pivotally mounting said strut in full cantilever suspension on the wing on a pivot skewed from the planes of said reenforcing members to bring the wheel to a retracted position offset from the extended position thereof, said mounting means including a retracting mechanism supporting said strut, and a cubic gear-box enclosing said retracting mechanism and said skewed pivot and fitting exactly into one of said cubiform cells.

2. In a full flush retractable landing gear for an airplane having a multi-cellular wing structure including longitudinal and lateral reenforcing members at spaced intervals with cubiform cells there-between, a wheel-supporting strut, means pivotally mounting said strut in full cantilever suspension on the wing on a pivot skewed from the planes of said reenforcing members to bring the wheel to a retracted position offset from the extended position thereof, said mounting means including a retracting mechanism supporting said strut, a cubic gear-box enclosing said retracting mechanism and said skewed pivot and, fitting closely into one of said cubiform cells and fastening means to removably secure said gear-box to the adjacent said reenforcing members.

3. In a full flush retractable landing gear for an airplane having a multi-cellular wing structure including longitudinal and lateral reenforcing members with cubiform cells there-between, a wheel-supporting strut, a compact retracting mechanism holding said strut in cantilever suspension for swinging movement to or from retracted position, said retracting mechanism being housed entirely in one of said cells and comprising a hub carrying said strut, a toothed sector fixed on said hug, a globoidal worm in mesh with said toothed sector, and a cubic gear-box fitting one of said wing cells and rotatably mounting said hub and worm.

4. In a full flush retractable landing gear for an airplane having a multi-cellular wing structure including longitudinal and lateral reenforcing members with cubiform cells there-between, a wheel-supporting strut, a compact retracting mechanism holding said strut in cantilever suspension for swinging movement to or from retracted position, said retracting mechanism being housed entirely in one of said cells and comprising a hub carrying said strut, a toothed sector splined on said hub, a globoidal worm in mesh with said toothed sector, a cubic gear-box fitting one of said wing cells fastening means detachably securing said gear-box to the adjacent said reenforcing members, means rotatably mounting said worm in said gear-box, and a spindle rotatably supporting said hub and having its ends held on said frame.

5. In a full flush retractable landing gear for an airplane having a multi-cellular wing structure including longitudinal and lateral reenforcing members with cubiform cells there-between, a wheel-supporting strut, a compact retracting mechanism holding said strut in cantilever suspension for swinging movement to or from retracted position, said retracting mechanism being housed entirely in one of said cells and comprising a hub carrying said strut, a toothed sector splined on said hub, a globoidal worm in mesh with said toothed sector, a cubic gear-box fitting one of said wing cells and detachably secured to the adjacent said reinforcing members, means rotatably mounting said worm, in said gear-box a trunnion formed at each end of said hub and inwardly projecting journals, integral with this gear-box, and forming pivots for these trunnions.

6. In a full flush retractable landing gear for an airplane having a multi-cellular wing structure including longitudinal and lateral reenforcing members with cubiform cells there-between, a wheel-supporting strut, a compact retracting mechanism holding said strut in cantilever suspension for swinging movement to or from retracted position, said retracting mechanism being housed entirely in one of said cells and comprising a hub carrying said strut, a toothed sector splined on said hub, a globoidal worm in mesh with said toothed sector, a cubic gear-box fitting one of said wing cells and detachably secured to the adjacent said reinforcing members and means rotatably mounting said worm in said gear-box, these last-mentioned means comprising radial roller-bearing a radial-thrust ball-bearing having inner and outer races and adapted to sustain normal thrust loads on said worm imparted during the retracting and protracting of the landing gear, said mounting means also including a pair of normally ineffective fixed thrust bearings for sustaining said worm under the reaction of road shocks imparted to said strut, said radial-thrust bearing having its inner and outer races relatively displaced axially to pre-stress said bearing to the normal strut-actuating thrust load on said worm, the races of said radial-thrust bearing being deflectable under abnormal thrust loads to impart said abnormal loads to said fixed thrust bearings.

7. In a retracting mechanism for airplane landing gear having a wheel-supporting strut pivotally mounted for retractive movement of the landing gear, said retracting mechanism comprising a worm gear drive of the double enveloping type, a common bearing bracket for both the worm and gear of said drive, means on the gear of said drive gear cooperative with said bracket in the fully extended position of said strut to prevent lateral deflection of said gear beyond its elastic limit under heavy lateral and torsional stresses.

8. In a full flush retractable landing gear for an airplane having a multi-cellular wing structure including longitudinal and lateral reenforcing members with cubiform cells there-between, a wheel-supporting strut, a compact retracting mechanism holding said strut in cantilever suspension for swinging movement to or from retracted position, said retracting mechanism being housed entirely in one of said cells and comprising a hub carrying said strut, a toothed sector splined on said hub, a globoidal worm in mesh with said toothed sector, a cubic gear-box fitting one of said wing cells and detachably secured to the adjacent said reinforcing members and means rotatably mounting said worm in said gear-box, these last-mentioned means comprising radial roller-bearing, a preloaded thrust ball bearing for the normal axial loads and a pair of fixed thrust bearings abutting the respective ends of the worm and normally ineffective but adapted to enter into action and thereby relieving said ball bearing just before the thrust load reaches the limit of elasticity of said ball bearing.

9. In an electrically driven landing gear for airplanes having a control switch and a wheel-supporting strut pivotally mounted for retractive movement of the landing gear, a retracting mechanism comprising a worm gear drive of the double enveloping type, a common bearing bracket for both the worm and the gear of said drive, an emergency or safety stop on said bracket and a lug adjacent the periphery of the gear of said drive engageable with said stop of the bearing bracket in the fully extended position of said strut and effective only if the control switch fails to stop the electric motor at a previously determined instant.

10. In an aircraft retractable landing gear of the type comprising a pivoted wheel support and a driven rotatable shaft operatively connected to the wheel support for actuating the wheel support, said shaft being subject to normal thrust forces in raising and lowering the wheel support and to abnormal thrust forces when serving to lock the wheel support in lowered ground-engaging position; an anti-friction thrust bearing encircling said shaft comprising concentric inner and outer race rings and a plurality of rolling contact members interposed between said race rings, said anti-friction thrust bearing being stressed before use to substantially its maximum thrust capacity and a normally ineffective fixed thrust bearing associated with said shaft adapted to resist abnormal thrust forces.

11. In an aircraft retractable landing gear of the type comprising a wheel-support and a driven rotatable shaft operatively connected to the wheel support for retracting and extending the wheel support, said shaft being subject to normal thrust forces in actuating the wheel support and to abnormal thrust forces when serving to lock the wheel support in lowered ground-engaging position, an anti-friction bearing encircling said shaft comprising concentric inner and outer race rings and a plurality of rolling contact members interposed between said race rings, and a normally-ineffective fixed thrust bearing associated with said shaft adapted to resist abnormal thrust forces; the method of adjusting the bearings to take said forces including pre-stressing said anti-friction thrust bearing to substantially its maximum thrust capacity by displacing said race rings relative to each other out of a common plane, whereby the radial thrust bearing sustains the shaft against normal thrust forces and the fixed thrust bearing sustains the shaft against abnormal thrust forces upon yielding of the radial thrust bearing.

PAUL PEVNEY.